April 14, 1936.   M. C. WILLS ET AL   2,037,055
BRAKING MECHANISM
Filed May 1, 1933   3 Sheets-Sheet 3
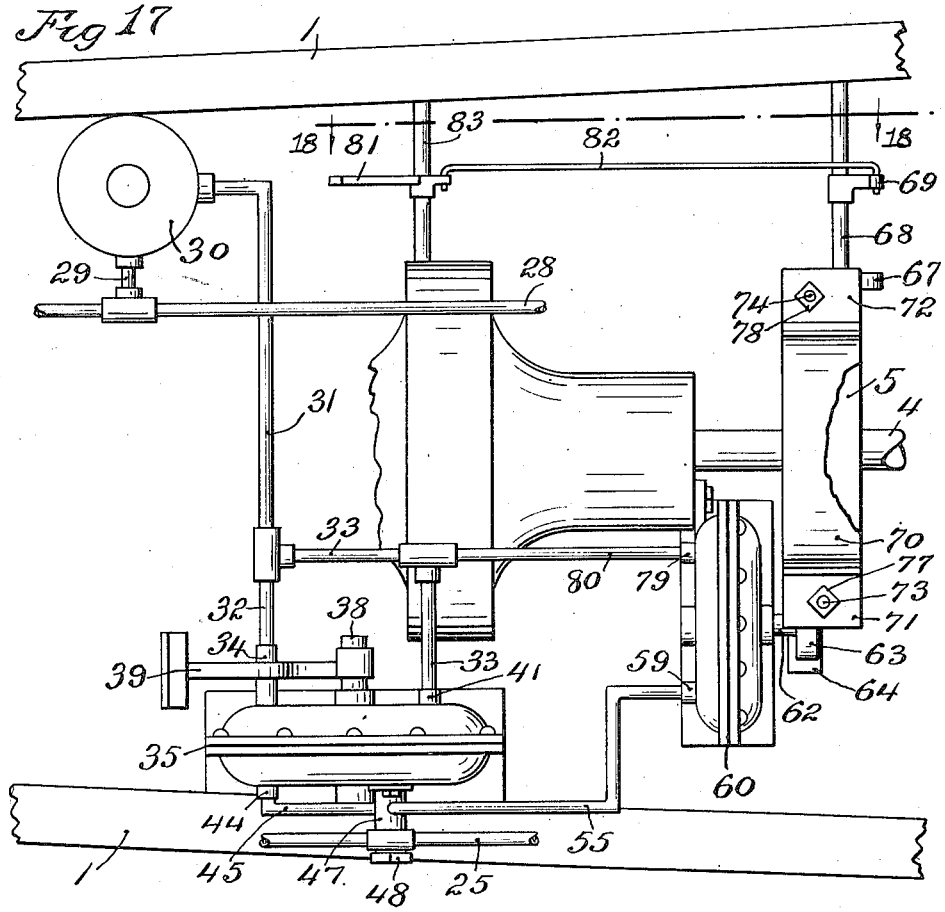
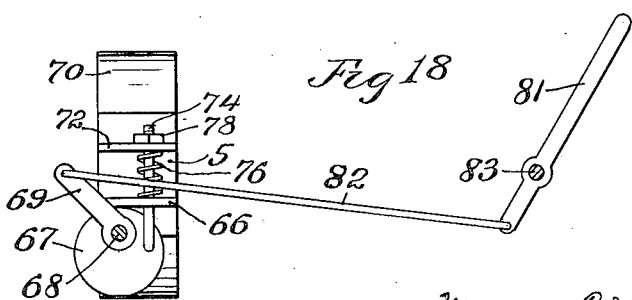
Marion C. Wills INVENTORS
Albert R. Henry
BY Warren D. House
Their ATTORNEY.

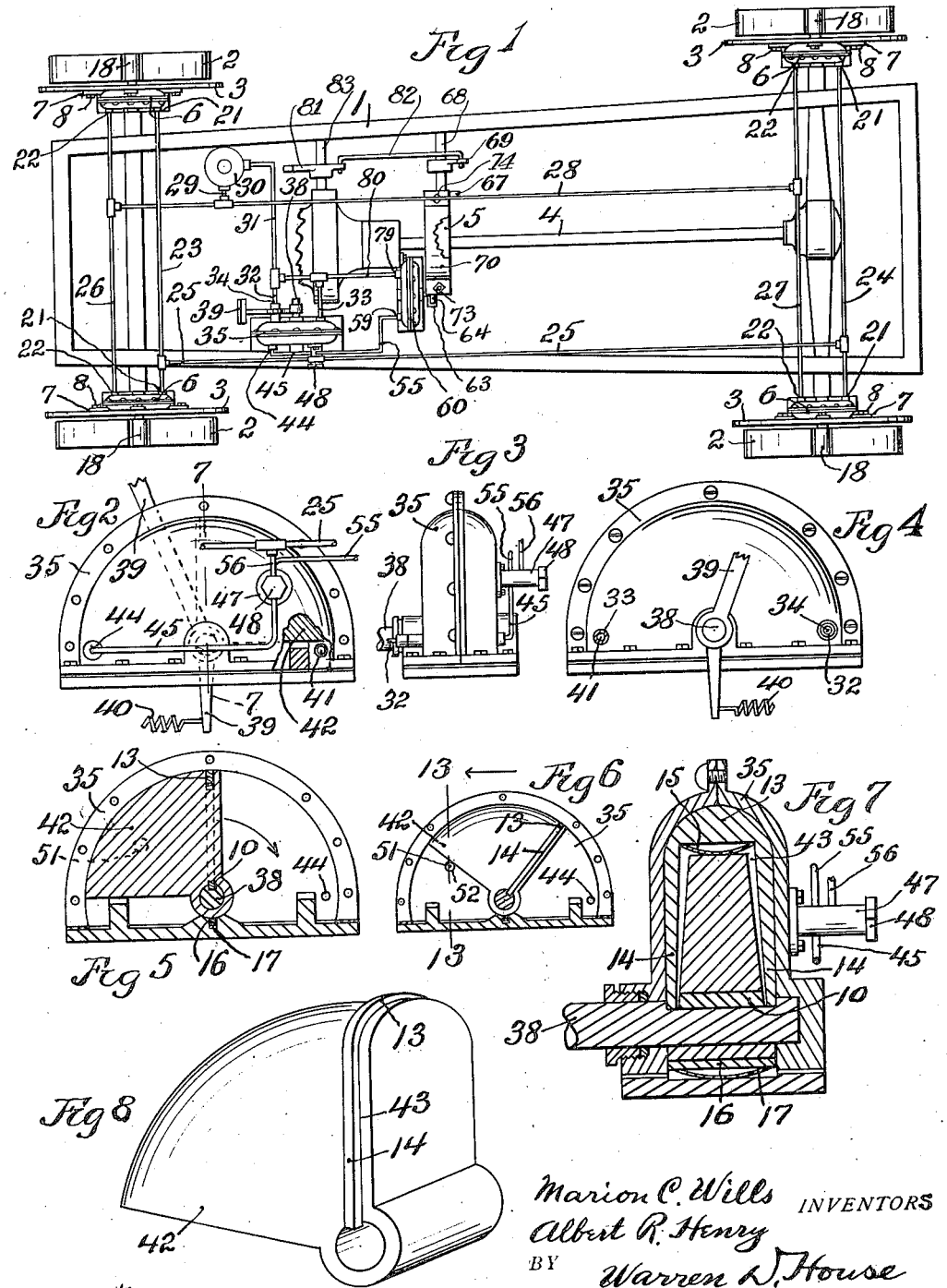

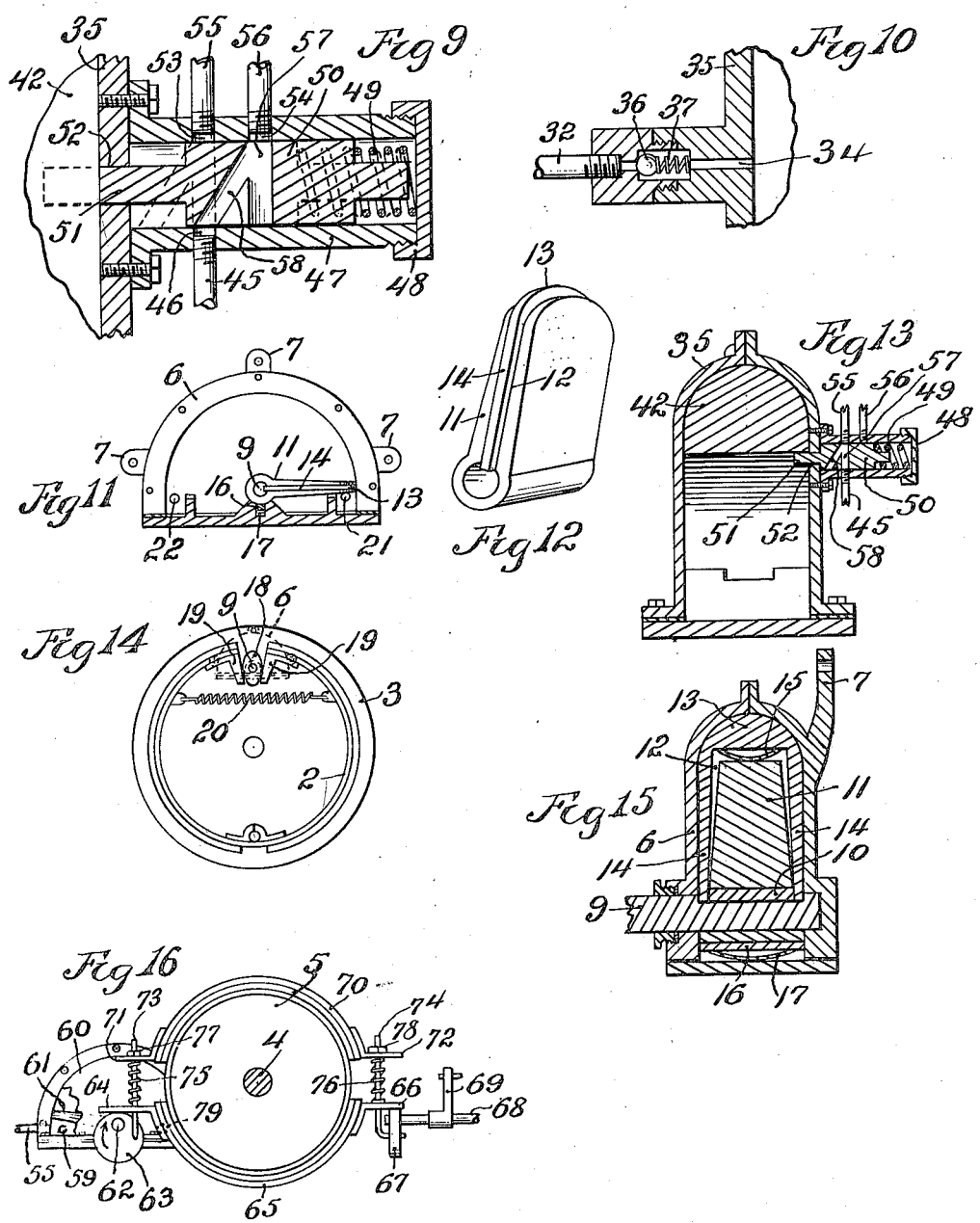

Patented Apr. 14, 1936

2,037,055

UNITED STATES PATENT OFFICE 2,037,055

BRAKING MECHANISM

Marion C. Wills, Kansas City, Mo., and Albert R. Henry, Salina, Kans.

Application May 1, 1933, Serial No. 668,736

11 Claims. (Cl. 188—152)

Our invention relates to improvements in braking mechanisms. It is particularly well adapted for use in automobile braking mechanisms, of both expanding and contracting band types.

One of the objects of our invention is to provide a novel braking mechanism, which is simple, relatively cheap to make and install, which will apply at the same time an equal braking pressure to all of the wheels of the vehicle, which has relatively few parts, is strong and not likely to get out of order.

A further object of our invention is to provide a novel hydraulic braking mechanism.

Still another object of our invention is the provision, in a braking mechanism employing two or more braking members one of which is for emergency purposes, of novel means by which the emergency braking member will be actuated in the event of the other braking members failing to operate efficiently.

Another object of our invention is the provision of novel means by which a single manually actuated operating member when moved in one direction effects the setting of one set of brakes, but in case of said brakes failing to operate efficiently the operating member will by continued movement in that direction effect the application of an emergency brake.

Our invention provides further novel means for operating a brake band of the expanding type, and also novel means for operating a brake band of the contracting type.

The novel features of our invention are hereinafter fully described and claimed.

In the accompanying drawings illustrative of the preferred embodiment of our invention, Fig. 1 is a plan view, reduced, of our improved braking mechanism, as applied to an automobile, portions of which are shown.

Fig. 2 is a side elevation, enlarged and partly broken away and in section, of the casing containing the pedal operated pivoted piston.

Fig. 3 is an end elevation of the same, the pedal being removed.

Fig. 4 is an elevation of what is shown in Fig. 2, looking at the opposite side thereof.

Fig. 5 is a central longitudinal section through the casing shown in Figs. 2 to 4, showing the pivoted piston in the initial inactive position.

Fig. 6 is a reduced view of the parts shown in Fig. 5, showing the piston as having passed the stop stem of the switch valve.

Fig. 7 is an enlarged section on the line 7—7 of Fig. 2, the pedal being removed.

Fig. 8 is a perspective view of the piston shown in Figs. 2, 5 and 6, the shaft being removed.

Fig. 9 is an enlarged longitudinal sectional view of the switch valve mechanism, showing, in solid lines, the valve retracted to its normal operative position.

Fig. 10 is an enlarged longitudinal sectional view of the check valve mechanism, shown in Figs. 1, 3 and 4.

Fig. 11 is a longitudinal central vertical sectional view of one of the wheel brake casings and the piston pivoted therein.

Fig. 12 is a perspective view of the piston, enlarged, shown in Fig. 11.

Fig. 13 is an enlarged section on the line 13—13 of Fig. 6.

Fig. 14 is an inside elevation of one of the wheel brake bands, the disk which supports it, the cam and shaft which exands it, and the braking casing shown in dotted lines mounted on the disk, the parts being shown reduced in size.

Fig. 15 is an enlarged central vertical sectional view taken transversely through one of the wheel brake casings, the piston therein being shown in the vertical position.

Fig. 16 is a reduced side elevation of the emergency braking mechanism provided with our improvement.

Fig. 17 is an enlarged plan view, partly broken away, of a portion of what is shown in Fig. 1.

Fig. 18 is a section on the line 18—18 of Fig. 17, distant parts being removed.

Similar characters of reference designate similar parts in the different views.

Referring particularly to Figs. 1, 14 and 16, 1 designates the usual chassis frame, 2 the usual expanding wheel brake bands, 3 the usual supporting disks on which the bands 2 are mounted, 4 the usual drive shaft, and 5 the emergency brake drum, such as in some cars, is mounted on and revoluble with the drive shaft 4.

Our invention provides four substantially semi-cylindrical casings 6 respectively fastened to the inner sides and upper portions of the disks 3, as shown in dotted lines in Fig. 14. For fastening the casings to the disks, each casing 6 is provided with peripheral ears 7 through which extend bolts 8 mounted in the adjacent disk 3, Figs. 1, 11 and 15.

Concentrically mounted in each casing 6 is an oscillative horizontal shaft 9, and splined by a key 10 to the shaft 9 within the adjacent casing 6, and thereby pivoted to the casing so as to oscillate therein, is a piston 11, Figs. 11, 12 and 15, which is provided with a continuous groove 12 extending across the outer end and radially in the side edges of the piston.

Radially slidably mounted in the groove 12 is an inverted U shaped sealing member 13 having resilient arms 14, which are held under compression by and tightly fit against the inner sides of the side walls of the casing 6 against which the perimeter of the sealing member 13 neatly and tightly fits.

An arcuate spring 15 in the outer end portion of the groove 12, bears against the piston 11 and against the inner side of the transverse part of the sealing member 13, thus normally forcing the latter tightly against the inner wall of the casing 6.

The ends of the arms 14 extend into the key way of the shaft 9 and across opposite ends of the key 10. Bearing against the arcuate inner end of the piston 11 is a sealing plate 16 against which bears an arcuate spring 17 which bears against the casing 6, for sealing the inner end portion of the piston, Fig. 15.

The shaft 9 extends outside the casing 6 and has fastened on and oscillative with its outer end an elliptical cam 18, which, as shown in Fig. 14, has its opposite sides normally respectively bearing aganist two bearing plates 19 secured respectively to the free end portions of the adjacent expanding wheel brake band 2, Fig. 14. A transverse coil spring 20 having its ends respectively fastened to end portions of the brake band 2, assists the resiliency of the band in normally retaining the band contracted, and the plates 19 against the cam 18.

Each casing 6 has adjacent to its bottom an inlet 21 for fluid, preferably a liquid, such as oil. The casing 6 has adjacent to its bottom, and at the side of the shaft 9 opposite to the inlet 21, an outlet 22 for the fluid entering the casing through said outlet, or for the fluid entering the casing through the inlet 21, and which should leak past the piston 11.

Fluid entering the casings 6 through the inlets 21, and being under pressure, will force the pistons 11, from the horizontal position shown in Fig. 11, toward the outlets 22, thus turning the shafts 9, so as to cause the cams 18 to force outwardly the plates 19, thereby expanding the brake bands against the adjacent brake drums respectively, said brake drums, not shown being respectively attached to the vehicle wheels, also not shown.

A fluid conductor 23 has its ends respectively communicating with the inlets 21 of the two front casings 6. A fluid conductor 24 has its ends respectively communicating with the inlets 21 of the two rear casings 6. A conductor for fluid 25 connects the conductors 23 and 24, Fig. 1.

A fluid conductor 26 has its ends respectively communicating with the outlets 22 of the front casings 6, and a conductor 27 has its ends communicating respectively with the outlets 22 of the rear casings 6.

A conductor 28 connects the conductors 26 and 27. A conductor 29 connects the conductor 28 with a liquid, such as oil, supply tank 30.

For manually forcing fluid from the tank 30 to the conductor 25 through which the fluid will be carried to the inlets 21 of the casings 6, by way of the conductors 23 and 24, the tank 30 has connected to it a fluid conductor 31 having two branches 32 and 33. The branch 32 is connected with an inlet 34 provided in one side of a casing 35, Fig. 4. Said inlet 34 has in it a ball check valve 36, Fig. 10, which is normally seated by a coil spring 37, said valve opening toward the casing 35.

The casing 35 corresponds substantially in structure to the casings 6, being semicylindrical, and having oscillatively mounted in it a shaft 38 corresponding to the shaft 9, and which extends outside the casing 35 and has secured to it so as to oscillate with it a manually operable pedal 39, Figs. 1, 2 and 4.

A coil spring 40 attached at one end to the pedal 39 and attached at its other end to a suitable anchor, not shown, normally retracts the pedal after it has been operated to set the brakes and then been released.

The side of the casing 35 to which is attached the branch 32, is provided with an opening 41, Figs. 1, 2 and 4, with which communicates the branch conductor 33.

Splined by means of a key 10 on the shaft 38 in the casing 35 is a piston 42, Figs. 2, 5, 6, 7, and 8, which is provided with a groove 43 extending from one end of the bore through the piston around the piston to the other end of the bore, which groove corresponds to the groove 12 of the piston 11.

Slidably fitted in the groove 43 is an inverted U shaped sealing member 13, corresponding to the sealing member 13 already described, and which is provided with resilient arms 14 which are held compressed by and fit snugly against the inner side walls of the casing 35, Fig. 7.

An arcuate spring 15 in the groove 43 bears against the piston 42 and against the inner side of the transverse portion of the sealing member 13, thus normally forcing the latter outwardly against the inner wall of the casing 35. The end portions of the arms 14 extend across the ends respectively of the key 10.

An arcuate spring 17 bearing against the casing 42 and against a sealing plate 16, holds the latter against the rounded inner end of the piston 42, Figs. 5, 6 and 7.

The casing 35 at the side opposite from the pedal 39, has an outlet 44 to which is connected a fluid conductor 45 which communicates with an inlet opening 46 in a valve casing 47, which is fastened to the adjacent outer side of the casing 35, Figs. 2, 7, 9 and 13. The valve casing 47 is tubular and has a threaded outer end on which is removably mounted a screw cap 48 against which bears one end of a coil spring 49, the other end of which bears against the adjacent end of a switch valve 50 reciprocatively mounted in the valve casing 47 and having at its inner end a longitudinal stem 51, which is slidable in a hole 52 extending through the adjacent wall of the casing 35.

Normally the stem 51 bears against the adjacent side of the piston 42, whereby the valve 50 is normally held retracted to the position shown in solid lines in Fig. 9, against the pressure of the spring 49.

The valve casing 47 has, opposite the inlet 46, two outlets 53 ad 54 respectively communicating with two fluid conductors 55 and 56, the latter communicating with the conductor 25.

The valve 50 has through it a passage 57, which, in the retracted position of the valve, shown in solid lines in Fig. 9, registers with the outlet 54. The passage 57 has a branch 58, which when the valve 50 is in said retracted position, registers with the inlet 46, so that in the retracted position of the valve 50, fluid will pass from the conductor 45, through the inlet 46, branch 58, passage 57, outlet 54, conductor 56, conductor 25 to the conductors 23 and 24 in which the fluid is carried and discharged therefrom through the inlets 21 of the casings 6 into said casings, and under each piston 11, as shown in Fig. 11.

The pressure of the fluid thus entering the casings 6, forces the pistons 11 toward the outlets 22 of the casings 6, thus rocking the shafts 9, so as to cause the cams 18 thereon to turn and expand the brake bands 2 to the braking positions.

The fluid is forced through the conductor 45 and, by the path just described, into the casings 6 upon the depression of the pedal 39, whereby the shaft 38 is rocked so as to swing the piston 42 to the left, as viewed in Fig. 2, and to the right, as viewed in Figs. 5 and 6, and toward the outlet 44, thus forcing the fluid in front of the piston 42 through the outlet 44 into the conductor 45, through which the fluid under pressure is discharged through the valve 50, and conductors 56, 25, 23 and 24 into the casings 6, as has been described.

In case there is sufficient leakage of fluid in the system, or if for other reasons, the pressure applied by the piston 42 against the fluid, is insufficient to efficiently operate the wheel brakes, and the piston 42 swings far enough to pass the stop stem 51 of the valve 50, the spring 49 will force the valve 50 to the inner position, shown in dotted lines in Fig. 9, thus registering the passage 57 with the ports 46 and 53.

Continued pressure downwardly on the pedal 39 will continue to force forwardly the piston 42, thus forcing the fluid from the casing 35 through the outlet 41, conductor 45, passage 57, and conductor 55, the valve 50 in moving to the inner position, closing the outlet 54 and stopping flow through the conductors 56, 25, 23 and 24 to the casings 6.

The conductor 55 communicates with an inlet 59 of a casing 60, Fig. 16 and Fig. 1, which corresponds in structure to the casings 6 and which has oscillative in it a piston 61 corresponding in structure to the pistons 11 and located above the inlet 59. The piston 61 is keyed on a horizontal shaft 62, corresponding to the shaft 9 and oscillative in and extending through one side of the casing 60, and which has secured to and oscillative with it a cam or eccentric 63, which bears against the under side of a lug 64 fastened to one end of an arcuate brake band 65, which has a bearing against the under side of the brake drum 5 which is secured on the drive shaft 4.

The other end of the brake band 65 has secured to it a lug 66 against the under side of which is adapted to bear a cam or eccentric 67, which is oscillative with a shaft 68 provided with a crank 69 connected to and adapted to be swung by a link 82 connected to the emergency hand operated brake lever 81 pivotally mounted on a rod 83 supported by the frame 1, Figs. 1, 17 and 18.

Against the upper side of the brake drum 5 is adapted to bear an arcuate brake band 70 having fastened to its ends respectively two lugs 71 and 72 through which extend respectively two vertical rods 73 and 74, the lower ends of which are pivoted respectively to the cams 63 and 67.

Two coil springs 75 and 76 respectively encircle the rods 73 and 74, and bear at their lower ends against the upper sides of the lugs 64 and 66, and which bear at their upper ends against the under side of the lugs 71 and 72, for normally forcing the brake bands 65 and 70 apart and from the braking position.

The rods 73 and 74 have respectively fitted on them nuts 77 and 78 which respectively bear against the upper sides of the lugs 71 and 72, for drawing the brake band 70 downwardly to the braking position, when the cams or eccentrics 63 and 67 are turned to apply the emergency brake bands 65 and 70 to the brake drum 5, through the intervention of either the rock shaft 68 or the rock shaft 62.

The casing 60 at the side opposite that adjacent to the cam 63 is provided with an outlet 79 located at the side of the piston 61 distant from the inlet 59. The outlet 79 communicates with a conductor 80, Fig. 1, which connects with the branch conductor 33.

From the foregoing description, it will be understood that when the pedal 39 is manually depressed to set the wheel brakes, the piston 42 in the casing 35 will force fluid, preferably oil, through the outlet 44, conductor 45, branch 58 and passage 57 of the valve 50, conductors 56, 25, 23 and 24 into the casings 6, thus swinging the pistons 11 so as to turn the cams 18 to expand the brake bands 2 into braking engagement with the brake drums, not shown, attached to the vehicle wheels.

When the piston 42 is retracted by the spring 40, the oil at one side of the piston passes out of the casing 35 through the conductor 33, and enters the casing 35 through the conductor 32 past the valve 36, when the piston is retracting.

When the pistons 11 are oscillated, the oil will alternately enter and be discharged from the casings 6 by each conductor 23 and 26.

When the piston 61 is moved toward the braking position, oil will be discharged from the casing 60 through the conductor 80, and when the piston 61 is retracted, the oil will pass from the casing 60 through the conductor 55, the stop stem 51 holding the piston 42 from retracting, and the spring 49 holding the valve 50 with its passage 57 alined with conductors 45 and 55.

When the piston 61 is retracted, such retraction is effected by the springs 75, 76, rods 73 and 74 and cams 63 and 67, and the oil then enters the casing 60 through the conductor 80.

From the above, it will be seen that the tank 30, with its pipe connections, keeps the casings 6, 35 and 60 supplied with oil, and that the oil in the casings offers small resistance to the retraction of the pistons in the casings.

With the use of oil as the operating fluid, there is little lost motion in setting the brakes, and the wheel brakes are applied with equal pressure. Due to the noncompressibility of the oil, the pistons 11, 42 and 61 have a short range of movement in applying the brakes.

With the employment of the pivoted oscillating pistons for applying the pressure to the oil, a simple structure of few parts compactly assembled is provided, which dispenses with link connections, loose joints and lost motion, and enables an easy manual application of the brakes with a relatively powerful pressure.

In case, through a breakage in pipe connections, or other reason for the wheel brakes becoming inefficient, and permitting the piston 42 swinging past the stop stem 51 of the valve 50, so that the braking application is made through the emergency mechanism and the drive shaft 4, as has been described, the continued application and use of the brakes will be effected through such emergency mechanism, until the valve 50 is retracted to enable the piston 42 being retracted to its normal working position, shown in Fig. 5. By removing the screw cap 48 access may be had to the valve 50 for retracting it. At such time the necessary repairs to the deranged part of the mechanism may be made.

Various modifications of our invention, within the scope of the appended claims, may be made without departing from the spirit of our invention.

What we claim is:—

1. In a braking mechanism, the combination with two braking members, of two fluid actuated means engaging respectively and adapted to move said braking members to the braking positions, and arranged each to be operated by fluid under pressure, and means for supplying fluid under pressure to said two fluid actuated means and having means arranged when operated to first supply one only of said fluid actuated means with fluid under pressure, and to then cut off said supply to said one fluid actuated means and effect the supply of fluid under pressure to the other of said two fluid actuated means.

2. In a braking mechanism, the combination with two braking members, of two casings, two pistons respectively oscillative in said casings, means actuated by said pistons respectively for moving said braking members to the braking positions, when said pistons move in one direction, and means for forcing fluid under pressure into said casings for moving said pistons in said direction, having means by which the fluid under pressure will be supplied to said casings in consecutive order and by which said fluid will be cut off from the casing first supplied when the fluid is supplied to the other casing.

3. In a braking mechanism, the combination with two braking members, of two fluid pressure actuated means for respectively moving said members to the braking positions, a casing having an outlet, a piston oscillative in said casing and adapted when moved in one direction to force fluid under pressure out of said casing through said outlet, manually operated means for moving said piston in said direction, fluid conducting means connected with said outlet and having two branches respectively connected with said two fluid pressure actuated means, and means controlled by said piston by which during the initial movement of said piston in said direction fluid under pressure will be forced from said casing through one only of said branches, and, after said piston has moved in said direction a predetermined distance fluid under pressure will be cut off from said one branch and then will be forced from said casing through the other only of said branches.

4. In a braking mechanism, the combination with two braking members, and two fluid pressure actuated means for respectively moving said members to the braking position, of a casing having an outlet, a piston oscillative in said casing and when moved in one direction forcing fluid under pressure out of said outlet, means for moving said piston in said direction, fluid conducting means connected with said outlet and having two branches respectively connected with said two fluid pressure actuated means, a valve movable to two positions in each of which it will close one of said branches and leave the other open, said piston in the initial part of its movement in said direction holding said valve in one of said positions, and means which forces said valve to the other of said two positions after said piston has moved a predetermined distance in said direction and has released said valve.

5. In a braking mechanism, the combination with two braking members, and two fluid pressure actuated means for respectively moving said members to the braking position, of a casing having an outlet, a piston oscillative in said casing and when moved in one direction forcing fluid under pressure out of said outlet, means for moving said piston in said direction, fluid conducting means connected with said outlet and having two branches respectively connected with said fluid pressure actuated means, a valve movable to two positions in each of which it will close one of said branches and leave the other open said piston in the initial part of its movement in said direction holding said valve in one of said two positions, means which forces said valve to the other of said two positions after said piston has moved a predetermined distance in said direction and released said valve, and means actuated by said valve when it is in the last named position for engaging and holding said piston from retracting to its initial valve holding position.

6. In a braking mechanism, the combination with two braking members, and two fluid pressure actuated means for respectively moving said members to the braking position, of a casing having an outlet, a piston oscillative in said casing and when moved in one direction forcing fluid under pressure out of said outlet, means for moving said piston in said direction, fluid conducting means connected with said outlet and having two branches respectively connected with said two fluid pressure actuated means, a valve movable to two positions in each of which it will close one of said branches and leave the other open, said piston in the initial part of its movement in said direction holding said valve in one of said two positions, and a spring for forcing said valve to the other of said two positions after said piston has moved a predetermined distance in said direction and has released said valve, said valve in the last named position engaging and holding said piston from retracting to its initial valve holding position.

7. In a power mechanism, a casing having an outlet, a piston oscillative in said casing and when moved in one direction forcing fluid under pressure out of said outlet, means for moving said piston in said direction, fluid conducting means connected with said outlet and having two branches, a valve movable to two positions in each of which it will close one of said branches while leaving the other open, said piston in the initial part of its movement holding said valve in one of said two positions, and means which forces said valve to the other of said two positions after said piston has moved a predetermined distance in said direction and has released said valve.

8. In a power mechanism, a casing having an outlet, a piston oscillative in said casing and when moved in one direction forcing fluid under pressure out of said outlet, means for moving said piston in said direction, fluid conducting means connected with said outlet and having two branches, a valve movable to two positions in each of which it will close one of said branches and leave the other open, said piston in the initial part of its movement holding said valve in one of said two positions, and means which forces said valve to the other of said two positions when said piston has moved a predetermined distance in said direction and has released said valve, said valve in the last named position engaging and holding said piston from retracting to its initial valve holding position.

9. In a power applying mechanism, a casing having an outlet, a piston oscillative in said casing and when moved in one direction forcing fluid under pressure out of said outlet, means for moving said piston in said direction, fluid conducting means connected with said outlet and having two branches, a valve movable to two positions in each of which it will close one of said branches while leaving the other open, said piston in the initial part of its movement holding said valve in one of said two positions, and means which forces said valve to the other of said two positions after said piston has moved a predetermined distance in said direction and has released said valve, said valve in the last named position engaging and holding said piston from retracting to its initial valve holding position but permitting it to oscillate.

10. In a power applying mechanism, a casing having an outlet, a piston oscillative in said casing and when moved in one direction forcing fluid under pressure out of said outlet, means for moving said piston in said direction, fluid conducting means connected with said outlet and having two branches, a valve movable to two positions in each of which it will close one of said branches while leaving the other open, said piston in the initial part of its movement in said direction holding said valve in one of said two positions, and a spring which forces said valve to the other of said two positions after said piston has moved a predetermined distance in said direction and has released said valve, said valve in the last named position engaging and holding said piston from retracting to its initial valve holding position but permitting said piston to oscillate.

11. In a braking mechanism having two braking members, two fluid pressure actuated means for respectively moving said members to the braking positions, two fluid conductors respectively connected to said two pressure actuated means, and manually operated means for forcing fluid under pressure through said conductors, the combination with said manually operated means, of means by which said operating means first supplies fluid to one of said conductors and is then cut off from said conductor and connected with the other conductor, and means for holding said operating means from again connecting with the conductor first supplied while permitting its continued connection with the other conductor.

MARION C. WILLS.
ALBERT R. HENRY.